(12) United States Patent
Markert et al.

(10) Patent No.: US 7,893,573 B2
(45) Date of Patent: Feb. 22, 2011

(54) DRIVE SYSTEM

(75) Inventors: Christian Markert, Fladungen (DE);
Markus Oestreich, Schlitz (DE);
Arnold Scheer, Leipzig (DE)

(73) Assignee: Siemens Aktiengesellschaft, München (DE)

( * ) Notice: Subject to any disclaimer, the term of this patent is extended or adjusted under 35 U.S.C. 154(b) by 93 days.

(21) Appl. No.: 12/302,395

(22) PCT Filed: Apr. 25, 2007

(86) PCT No.: PCT/EP2007/054028

§ 371 (c)(1),
(2), (4) Date: Nov. 25, 2008

(87) PCT Pub. No.: WO2007/137917

PCT Pub. Date: Dec. 6, 2007

(65) Prior Publication Data

US 2009/0230789 A1  Sep. 17, 2009

(30) Foreign Application Priority Data

May 26, 2006   (DE) .................... 10 2006 024 712

(51) Int. Cl.
*H02K 9/19* (2006.01)
(52) U.S. Cl. .......................................... 310/54; 310/90
(58) Field of Classification Search .................. 310/54, 310/90; 425/376.1, 542
See application file for complete search history.

(56) References Cited

U.S. PATENT DOCUMENTS

| 2,770,891 | A |   | 11/1956 | Wendel |
| 4,541,736 | A |   | 9/1985 | Giebeler, Jr. |
| 5,181,837 | A | * | 1/1993 | Niemiec .................... 417/350 |
| 5,753,986 | A | * | 5/1998 | Ohtani ........................ 310/56 |
| 6,616,421 | B2 | * | 9/2003 | Mruk et al. ................. 417/350 |
| 6,672,208 | B2 | * | 1/2004 | Bechtler et al. .......... 101/351.1 |
| 2001/0037651 | A1 |   | 11/2001 | Butterworth |
| 2006/0186750 | A1 | * | 8/2006 | Hosoe ........................ 310/114 |

FOREIGN PATENT DOCUMENTS

| DE |           262 265 A1 | 11/1988 |
| DE |        199 09 307 A1 | 9/1999 |
| DE |        102 20 552 A1 | 11/2003 |
| DE | 10 2004 039 412 A1 | 3/2006 |
| JP |         9 117103 A | 5/1997 |
| WO |      WO 92/17932 A1 | 10/1992 |
| WO |     WO 2005/018907 A1 | 3/2005 |

* cited by examiner

*Primary Examiner*—Quyen Leung
*Assistant Examiner*—Naishadh N Desai
(74) *Attorney, Agent, or Firm*—Henry M. Feiereisen; Ursula B. Day

(57) ABSTRACT

The invention relates to a drive system having at least one electrical direct drive and at least one bearing module, wherein the bearing module has a radial bearing and/or an axial bearing, and wherein the electrical direct drive and the bearing module have a cooling device.

14 Claims, 4 Drawing Sheets

DRIVE SYSTEM

BACKGROUND OF THE INVENTION

The invention relates to a drive system having an electric direct drive and at least one bearing module, wherein the bearing module has a radial bearing and/or an axial bearing.

Drive systems having electric direct drives are known. In this drive concept, mechanical transmission elements such as, for example, a gear mechanism are dispensed with since the torque is transmitted directly onto the drive shaft by means of a direct drive. A direct drive is therefore, in particular, shaftless since the part to be moved, i.e. the rotor, is provided for connection by flanges to the drive shaft. The torque is generally produced by means of a fixed stator which transmits the torque directly onto the rotor via the air gap.

DE 199 09 307 A1 discloses a production machine with electric drives for use in the plastics industry, with at least one electric drive being embodied as a direct drive.

For a drive system with an electric direct drive it is necessary in many machine applications, in particular wherever increased axial loads affect the direct drive, to correspondingly absorb the axial and radial forces which occur during operation. This is done, for example, by means of axial and radial bearings. However, in the bearing system of a direct drive such standard bearings are often overloaded, and therefore what are referred to as bearing modules are arranged upstream, depending on the load, in order to avoid overloading of the actual bearings. The bearing modules which are embodied with oil lubrication, and also the bearings, heat up during operation owing to frictional and churning losses and even overheat in some cases. As a result, the bearing service lives and the service times of the lubricant are shortened considerably. Furthermore, overheating can also lead to a brief failure of the entire machine.

SUMMARY OF THE INVENTION

The object of the present invention is to make available a drive system which ensures reliable operation, in particular in the region of the bearing system of the direct drive.

This object is achieved by a drive system having at least one electric direct drive and at least one bearing module, wherein the bearing module has a radial bearing and/or an axial bearing, wherein the electric direct drive and the bearing module have a cooling device.

The drive system has at least one electric direct drive and at least one bearing module with a radial bearing and an axial bearing which are generally referred to as pressure bearings. The electric direct drive and the bearing module have a cooling device.

A direct drive with pressure bearings provides numerous advantages over a geared motor or electric motor and transmission. Transmissions are very maintenance-intensive and have high frictional losses. As a result, the process-engineering calculations of the torque, which increase the precision of the device/machine, are made more difficult. The torque of a direct drive can be derived virtually directly from the motor power. By using a direct drive it is possible to connect the drive to the device/machine mechanism without coupling elements. This permits space-saving and economical installation of the drive.

The direct drive may also be embodied as a built-in motor. Built-in motors are motors which are supplied as built-in components. For a complete drive unit, additional components such as, for example, a bearing and a rotary encoder are necessary.

Both the direct drive and the bearing module with an axial bearing and radial bearing, which are embodied, for example, as rolling bearings or sliding bearings, have a cooling device.

A cooling device or cooling systems serve to protect components against thermal overloading by virtue of the fact that the excess heat is conducted away. The cooling device includes, for example, a liquid cooling system in which the coolant which carries away heat is, for example, water. The heat which is produced is absorbed here by the coolant and output, for example, to the surrounding air via, for example, a heat exchanger or a radiator. The cooling device can also have, for example, a pump for a pump-controlled forced circulation cooling system.

The direct drive and the bearing module can have either one or more common cooling devices or a plurality of separate cooling devices. In the case of a common cooling device, a cooling circuit with a common heat exchanger or radiator is provided, and in this context the common cooling circuit can also have two component circuits which are coupled to a common cooling circuit. The direct drive and bearing module can also have separate, i.e. separated, cooling devices, in which case both the direct drive and the bearing module have a separate heat exchanger or radiator.

The arrangement of a cooling device avoids overheating of the components since frictional losses occur during operation of the direct drive and of the bearing module. For example, what are referred to as churning losses lead to an increase in the frictional power. The bearings run in the lubricant, during which process an oil mist or spray oil is produced, leading to the abovementioned churning losses.

Overheating is not desired since it loads the components and shortens their service life. This leads to additional costs for the repair or reprocurement of the components, Furthermore, overheating can also lead to failure or outage of the entire device/machine, which results in downtime costs in production. The cooling device increases the availability of the installation and reduces the maintenance costs. Furthermore, the resulting convection heat is carried away and therefore does not load the working environment. As a result of the lower surface temperatures of the components, working safety is ensured.

The cooling device advantageously comprises a first cooling circuit and a second cooling circuit, wherein the first cooling circuit is coupled to the second cooling circuit. A cooling circuit is assigned in each case to the direct drive and the bearing module. The first cooling circuit is arranged, for example, on the direct drive, and the second cooling circuit is arranged on the bearing module.

The cooling of the bearing module increases its lubricant service time, and change times of the lubricant can be lengthened. In addition, the cooling of the bearing module and its lubricant increases the service life of the bearings.

Separate cooling circuits simplify maintenance and servicing of the components. If, for example, a repair has to be performed on the bearing module, the bearing module can be dismounted and repaired individually. The cooling circuits can also be maintained separately.

The first cooling circuit and the second cooling circuit are preferably coupled in series or in parallel. The coupling can therefore be selected according to the user's requirements. The coupling of the cooling circuits obviates the need for a separate cooling assembly. The temperature of the cooling water of a cooling assembly rises empirically by approximately 5 K at the rated operating level of the motor.

The cooling device preferably has a cooling line in the form of a pipe and is embodied as a surface cooling means and/or as an internal cooling means. A surface cooling means of the direct drive and of the bearing module can easily be manufactured using the associated bearings. In this context, the cooling fluid flows around the stator of the direct drive and the bearing module or its bearing housing.

If the cooling circuit is embodied as an internal cooling means, for example as an internally located cooling coil in the lubricant sump or oil sump of the bearing module, the lubricant is cooled directly, as a result of which more effective cooling is achieved. In contrast, the complexity of manufacture is greater compared to a surface cooling system.

The coupling of the cooling circuits is preferably effected by means of a pipe element. Such coupling is easy to manufacture and cost-effective.

The coolant is advantageously a fluid, in particular water. However, the coolant can be any other cooling fluid.

The cooling device preferably has a digital or analog closed-loop control unit with an analog or digital interface. The use of customary sensors with analog outputs or customary digital open-loop and closed-loop control systems is therefore possible. The temperature of the lubricant of the bearing module is kept constant over the operating period by means of the closed-loop control unit.

The drive system is preferably provided for a device for processing plastic such as, for example, an injection molding machine or an extrusion machine or a production machine for the plastics industry.

However, a drive system according to the invention can also be used in many other machine applications, in particular wherever increased axial loads affect the direct drive and the resulting axial and radial forces are to be correspondingly absorbed. This may be the case, for example, in machines in which a worm is used to feed material to a processing means. This also applies, for example, to a meat grinder or similar applications. In the text which follows, the drive system can also be used in devices in which gravitational forces act directly in the axial direction on the drive or the direct drive, such as lifting gear, for example lifting platforms or lifting tables which are driven, for example, by means of ball bearing spindles.

BRIEF DESCRIPTION OF THE DRAWING

In the following description, further features and details of the invention will be explained in more detail on the basis of exemplary embodiments and in relation to the appended drawings. In this context, features and relationships which are described in individual variants can basically be transferred to all exemplary embodiments. In said drawings.

DETAILED DESCRIPTION OF PREFERRED EMBODIMENTS

Figure 1:
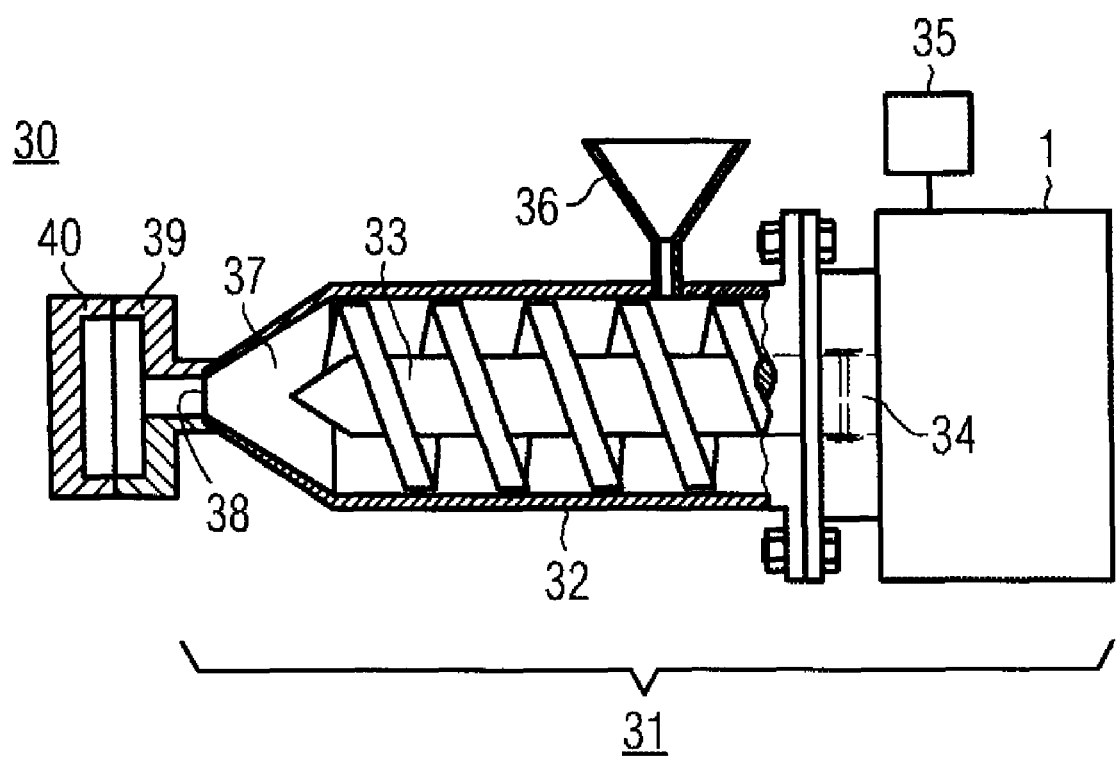
FIG. 1 shows the basic design of an injection molding machine.

FIG. 1 shows the basic design of an injection molding machine 30 which has an injection device 31. An advancing screw 33 is arranged inside a screw housing 32. The advancing screw 33 is coupled, for example, to the drive shaft 34. The drive shaft 34 can be driven by means of the electric machine 1. The closed-loop control of the electric machine is carried out by means of the closed-loop control system 35. In the plastic injection molding machine 30, a plastic granulate, which is not illustrated, is filled into a funnel 36 and passes via an opening into the screw housing 32. The advancing screw 33, which is of screw-shaped design, is driven by the electric machine 1 and feeds the plastic granulate into the advancing screw space 37. Heating sections (not shown) are usually located along the screw housing 32 in the axial direction and they contribute to ensuring that the plastic granulate is present in a plasticized form in the advancing screw space 37. The plasticized and fluid plastic material is introduced into a plastic injection mold from a nozzle-shaped opening 38 in the screw housing 32. The injection mold has, for example, the mold components 39 and 40. The fluid, plasticized plastic material solidifies in the injection mold and can be released from the mold after the injection process by moving the mold components 39 and 40 apart from one another.

Figure 2:
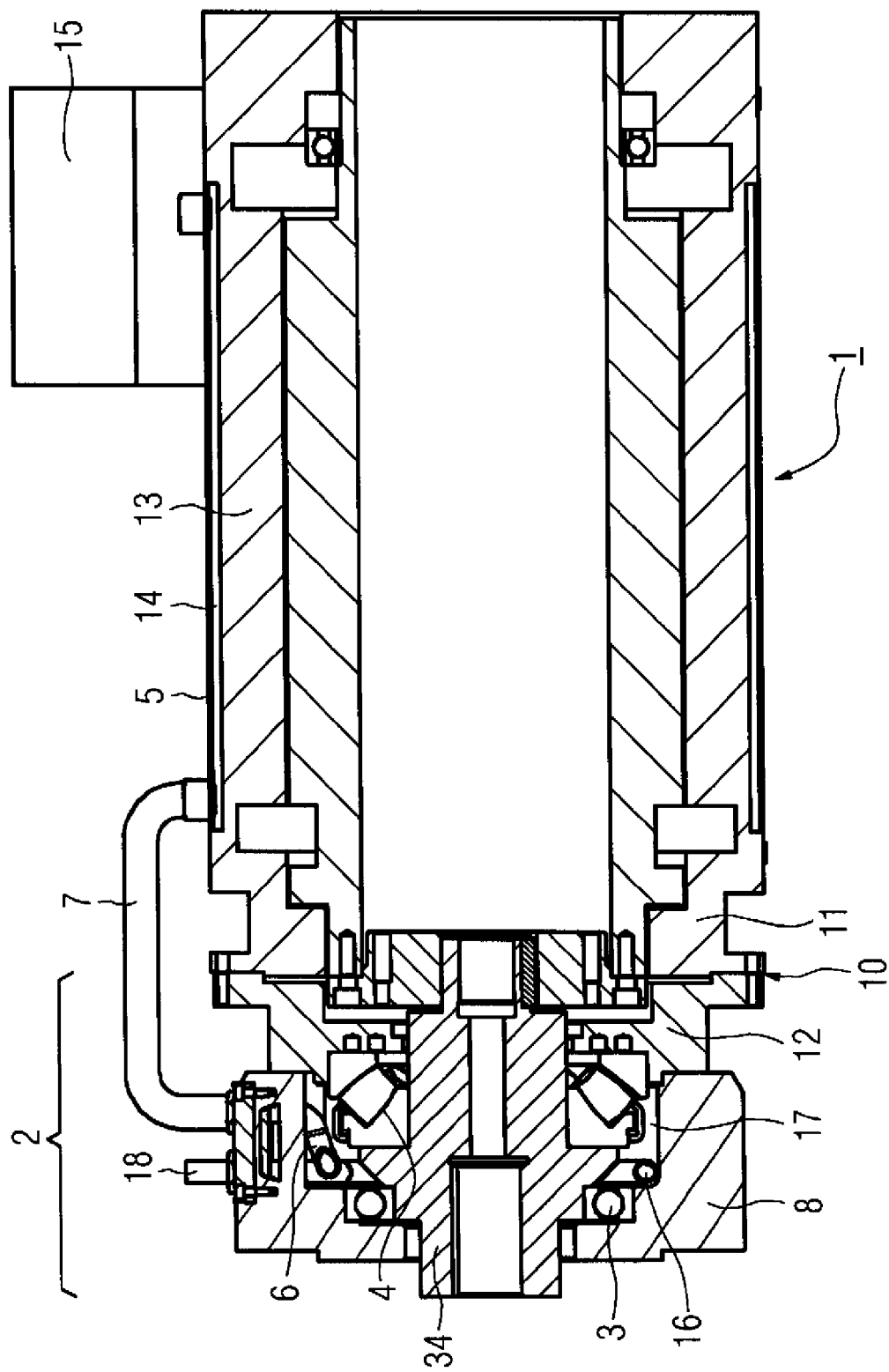
FIG. 2 shows a sectional illustration of a first exemplary embodiment of the drive system according to the invention.

FIG. 2 shows a sectional illustration of a first exemplary embodiment of the drive system according to the invention. The drive system has the electric machine 1, which is embodied as an electric direct drive, and the bearing module 2 with the bearing housing 8. The electric direct drive is embodied as a permanently excited synchronous motor or servosynchronous motor. The direct drive 1 and bearing module 2 are connected to one another at the interface 10 by means of the flanges 11 and 12. The drive shaft 34 is driven by the direct drive 1. The bearing module comprises the radial bearing 3 and the axial bearing 4. The direct drive 1 and the bearing module 2 have a cooling device. The cooling device comprises the first cooling circuit 5 and the second cooling circuit 6, wherein the first cooling circuit 5 is coupled to the second cooling circuit 6. The first cooling circuit 5 is arranged on the direct drive 1, and the second cooling circuit 6 is arranged on the bearing module 2. The first and second cooling circuits 5 and 6 are coupled serially by means of the pipe element 7. The cooling fluid is located in the coolant container 15. The cooling circuit 5 of the direct drive 1 is embodied as a surface cooling means. In this context, the cooling fluid flows around the stator 13 in a cooling jacket 14. Further coolant (not shown) passes from the coolant container 15 into the bearing module 2 via the pipe element 7. The cooling circuit 6 of the bearing module 2 is embodied as an internal cooling means. For this purpose, a cooling coil 16 which is located on the inside is arranged in the bearing module 2, directly in the lubricant sump 17 of the bearing module 2. In addition, the axial bearing 4 is also cooled. The cooling circuit 6 is closed by means of the cooling line 18 in the form of a pipe, illustrated here as a projection, which cooling line 18 is then returned, for example, into the coolant container 15.

Figure 3:
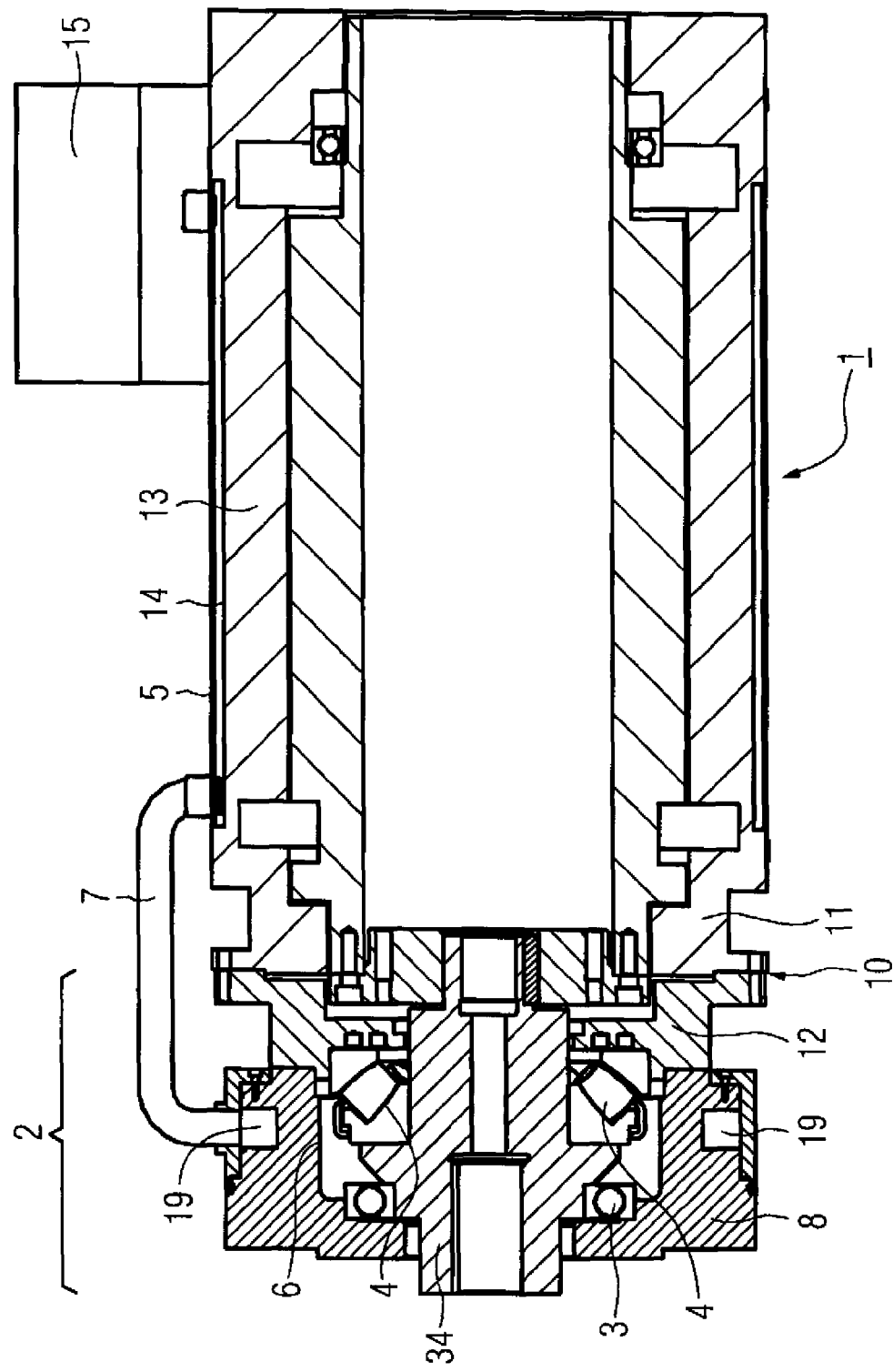
FIG. 3 shows a sectional illustration of a second exemplary embodiment of the drive system according to the invention.

FIG. 3 shows a sectional illustration of a second exemplary embodiment of the drive system according to the invention. The cooling circuit 5 of the direct drive 1 is embodied as a surface cooling means. Here, the cooling fluid flows around the stator 13, in a cooling jacket 14. Further coolant (not shown) passes from the coolant container 15 into the bearing module 2 via the pipe element 7. The cooling circuit 6 of the bearing module 2 is likewise embodied as a surface cooling means. For this purpose, an annular groove 19 is arranged in the bearing module 2, and the cooling fluid flows around the bearing housing 8 and also the axial bearing 4.

Figure 4:
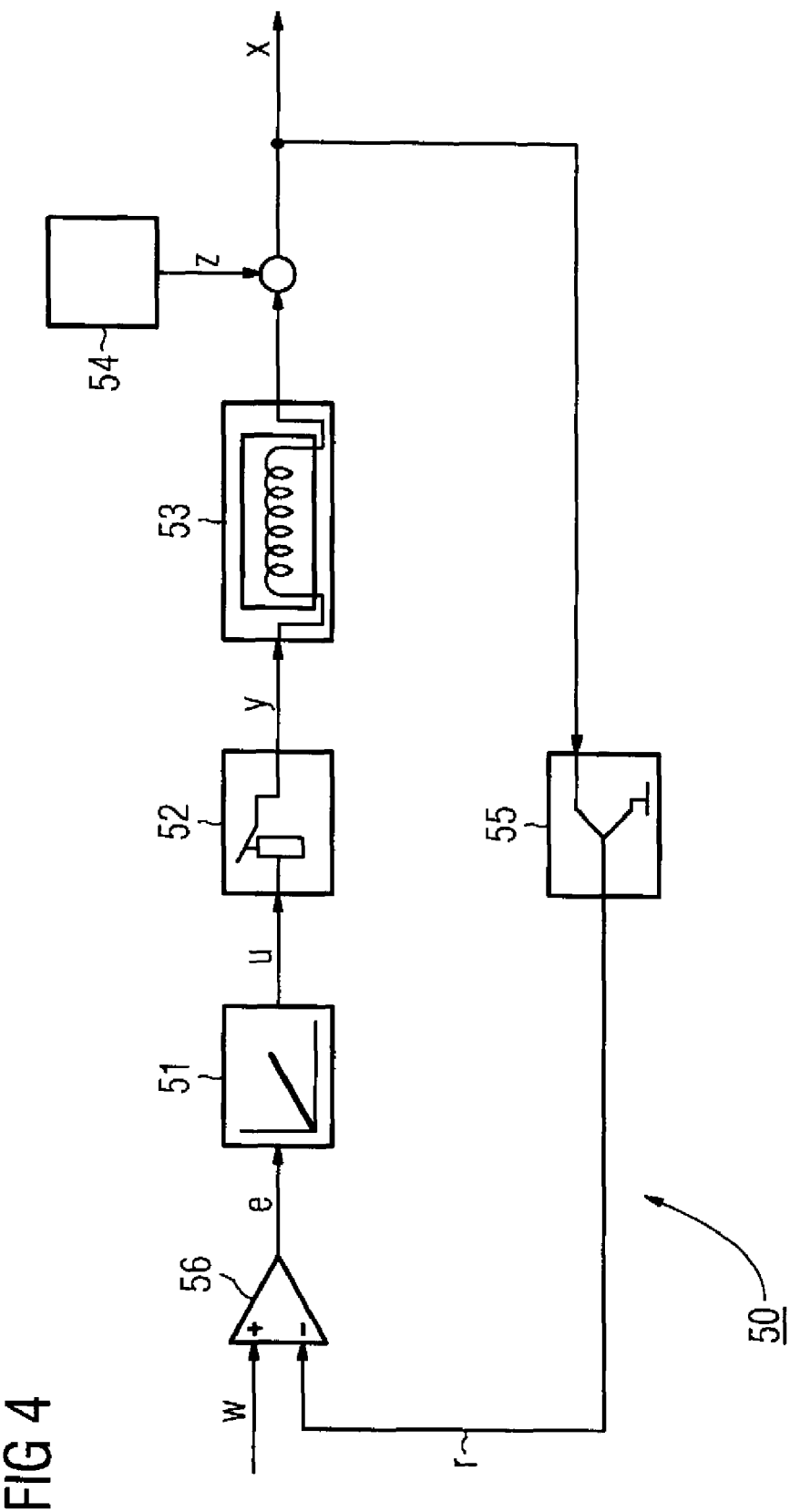
FIG. 4 shows a block circuit diagram of a closed-loop control circuit for the cooling device.

FIG. 4 shows a block circuit diagram of a closed-loop control circuit 50 for the cooling device for performing closed-loop control of the lubricant temperature of the bearing module 2 (not shown). The closed-loop control circuit 50 is used to adjust the closed-loop control variable x, which is the temperature of the lubricant, to a desired value, referred to as a guide variable w, and to keep it constant over the operating period, irrespective of faults which occur. For this purpose, the actual value r of the closed-loop control variable x, i.e. the temperature, is measured by means of the thermosensor 55 (measuring element). The difference between the actual value r (measured temperature) and setpoint value w (desired temperature) is then determined, for example with the operational amplifier 56. This difference is the closed-loop control deviation e and forms the input variable for the closed-loop controller 51 which is an I-controller in the present case. The closed-loop controller 51 calculates the open-loop control variable u on the basis of its transmission function, said open-loop control variable u driving the throttle 52 (actuator element), as a result of which a greater or smaller amount of cooling fluid passes to the bearing module/direct drive (control section 53). The output signal of the actuator element 52 is the manipulated variable y. The closed-loop control process is triggered either by changing the guide variable w or as a result of the interference 54. The interference 54 is, for example, friction in the bearings (radial bearings 3, axial bearings 4) or else churning losses of the lubricant, and is denoted as interference variable z.

What is claimed is:

1. A drive system, comprising:
   at least one electric direct drive;
   at least one bearing module including at least one member selected from the group consisting of radial bearing and an axial bearing; and
   a cooling device for cooling the electric direct drive and the bearing module, said cooling device including a cooling jacket receiving coolant and disposed in surrounding relationship to the electric drive to cool the electric direct drive, and a cooling coil disposed in fluid communication with the cooling jacket inside of the bearing module to cool the bearing module.

2. The drive system of claim 1, wherein the cooling jacket is part of a first cooling circuit arranged on the direct drive, and the cooling coil is part of a second cooling circuit arranged on the bearing module, wherein the first cooling circuit is coupled to the second cooling circuit.

3. The drive system of claim 2, wherein the first cooling circuit and the second cooling circuit are coupled in series.

4. The drive system of claim 2, wherein the first cooling circuit and the second cooling circuit are coupled in parallel.

5. The drive system of claim 1, wherein the cooling device includes a tubular cooling line and is embodied as a surface cooling system and/or as an internal cooling system.

6. The drive system of claim 2, wherein the cooling device includes a pipe element to couple the first and second cooling circuits with one another.

7. The drive system of claim 1, wherein the coolant is water.

8. The drive system of claim 1, wherein the cooling device has a closed-loop control unit with an analog or digital interface.

9. The drive system of claim 1, for use in an apparatus for processing plastic.

10. The drive system of claim 9, for use in an injection molding machine for processing plastic.

11. The drive system of claim 9, for use in an extrusion machine for processing plastic.

12. The drive system of claim 1, wherein the electric direct drive is embodied as a permanently excited synchronous motor.

13. The drive system of claim 1, wherein the cooling device includes a coolant container in fluid communication with the cooling jacket.

14. The drive system of claim 13, wherein the coolant container is placed on the direct drive.

* * * * *